United States Patent
Sebastiani et al.

(10) Patent No.: US 11,393,599 B2
(45) Date of Patent: Jul. 19, 2022

(54) SUBCRITICAL CORE REACTIVITY BIAS PROJECTION TECHNIQUE

(71) Applicant: Westinghouse Electric Company LLC, Cranberry Township, PA (US)

(72) Inventors: Patrick J. Sebastiani, Monroeville, PA (US); Mark W. Dicus, New Castle, PA (US); Louis R. Grobmyer, N. Huntingdon, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 324 days.

(21) Appl. No.: 16/217,378

(22) Filed: Dec. 12, 2018

(65) Prior Publication Data

US 2019/0180885 A1   Jun. 13, 2019

Related U.S. Application Data

(60) Provisional application No. 62/597,571, filed on Dec. 12, 2017.

(51) Int. Cl.
*G21C 17/108* (2006.01)
*G21C 1/30* (2006.01)
(Continued)

(52) U.S. Cl.
CPC ........... *G21C 17/108* (2013.01); *G06F 17/18* (2013.01); *G21C 1/303* (2013.01); *G21C 7/12* (2013.01);
(Continued)

(58) Field of Classification Search
CPC ............................ G21C 17/104; G21C 17/108
(Continued)

(56) References Cited

U.S. PATENT DOCUMENTS 4,781,881 A * 11/1988 Bernard, Jr. ............. G21C 7/36
376/216
6,801,593 B2   10/2004 Chao et al.
(Continued)

FOREIGN PATENT DOCUMENTS

EP          1071098 A1    1/2001
JP       2008157669 A  *  7/2008
(Continued)

OTHER PUBLICATIONS

Cupp, Philip, and M. D. Heibel. "Plant Outage Time Savings Provided by Subcritical Physics Testing at Vogtle Unit 2." International Conference on Nuclear Engineering. Vol. 42428. 2006. (Year: 2006).*
(Continued)

*Primary Examiner* — Jack W Keith
*Assistant Examiner* — Jinney Kil
(74) *Attorney, Agent, or Firm* — K&L Gates LLP

(57) ABSTRACT

A method to determine a global core reactivity bias and the corresponding estimated critical conditions of a nuclear reactor core prior to achieving reactor criticality. The method first requires collection and evaluation of the inverse count rate ratio (ICRR) data; specifically, fitting measured ICRR vs. predicted ICRR data. The global core reactivity bias is then determined as the amount of uniform reactivity adjustment to the prediction that produces an ideal comparison between the measurement and the prediction.

9 Claims, 1 Drawing Sheet

(51) Int. Cl.
 *G06F 17/18* (2006.01)
 *G21D 3/00* (2006.01)
 *G21C 7/12* (2006.01)
 *G21D 3/04* (2006.01)

(52) U.S. Cl.
 CPC ............ *G21D 3/001* (2013.01); *G21D 3/002* (2019.01); *G21D 3/004* (2019.01); *G21D 3/04* (2013.01)

(58) Field of Classification Search
 USPC .......................................................... 376/254
 See application file for complete search history.

(56) References Cited

U.S. PATENT DOCUMENTS

| | | | |
|---|---|---|---|
| 7,894,565 | B2 | 2/2011 | Heibel et al. |
| 2002/0122522 | A1* | 9/2002 | Goto ................... G21C 17/108 376/254 |
| 2004/0101082 | A1 | 5/2004 | Chao et al. |
| 2011/0002432 | A1* | 1/2011 | Heibel ................. G21C 17/00 376/254 |
| 2011/0268239 | A1* | 11/2011 | Krieg ..................... G21D 3/08 376/254 |
| 2016/0131775 | A1* | 5/2016 | Kono ..................... G01T 7/005 250/390.01 |

FOREIGN PATENT DOCUMENTS

| | | |
|---|---|---|
| JP | 2008157669 A | 7/2008 |
| JP | 2013003001 A | 1/2013 |
| KR | 1020140029571 A | 3/2014 |
| WO | 2019164570 | 8/2019 |

OTHER PUBLICATIONS

Chao, Y. A., et al. "The spatially corrected inverse count rate (SCICR) method for subcritical reactivity measurement." Transactions 91.1 (2004): 728-730. (Year: 2004).*
Chao et al. "The Spatially Corrected Inverse Count Rate (SCICR) Method for Subcritical Reactivity Measurement." Westinghouse WCAP-16260-NP-A Revision 1. 2007. (Year: 2007).*
Chao et al. "The Spatially Corrected Inverse Count Rate (SCICR) Method for Subcritical Reactivity Measurement." Westinghouse WCAP-16260-NP-A Revision 1. 2007. (Year: 2007) (Year: 2007).*
International Searching Authority, International Search Report and the Written Opinion for International Application No. PCT/US2018/065102, dated Sep. 18, 2019.
International Preliminary Report on Patentability for International PCT Application No. PCT/US2018/065102, dated Jun. 16, 2020.
Supplementary European Search Report for corresponding European Patent Application No. 18907212.7, dated Jul. 7, 2021.

* cited by examiner

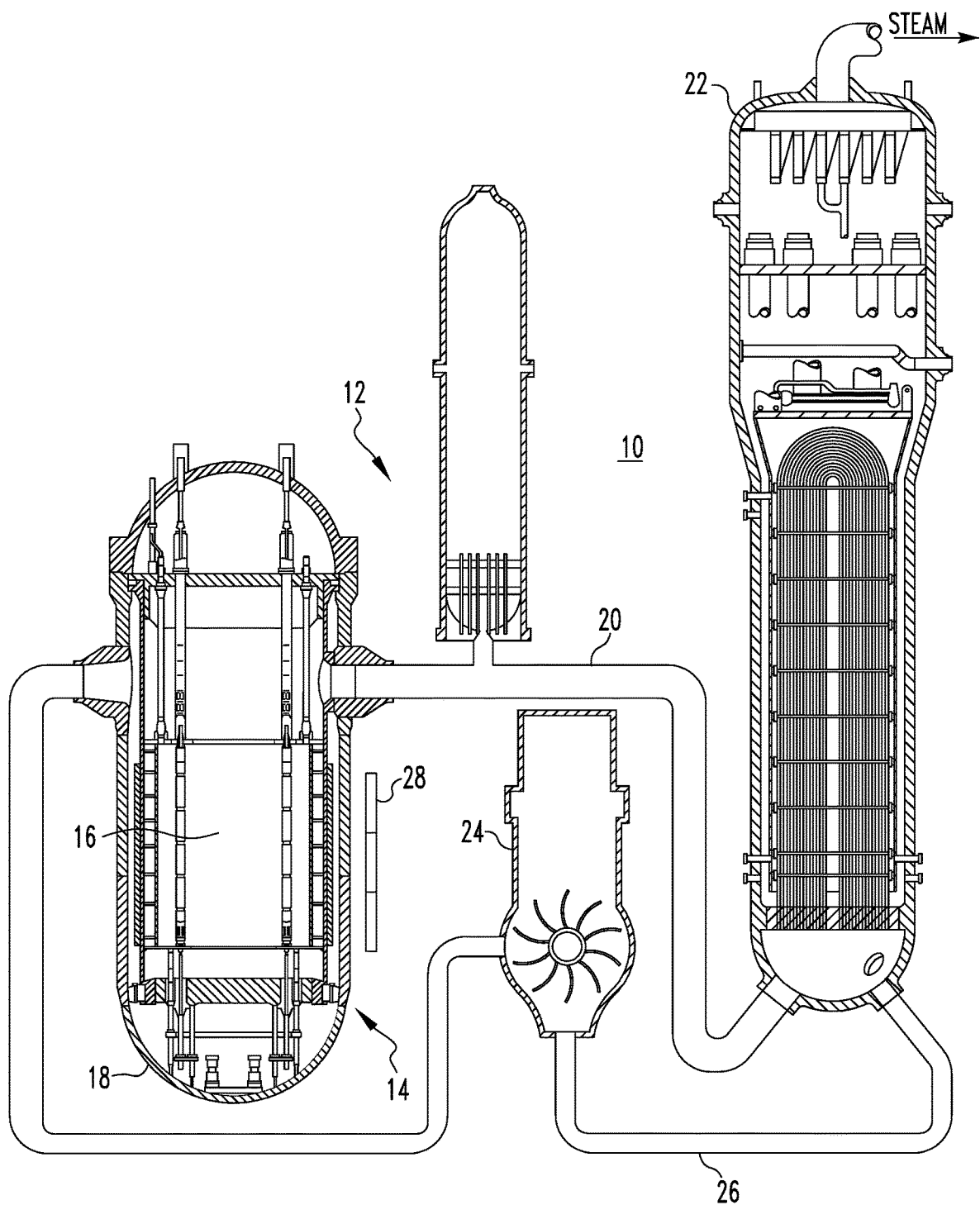

SUBCRITICAL CORE REACTIVITY BIAS PROJECTION TECHNIQUE

CROSS-REFERENCE TO RELATED APPLICATIONS

This patent application claims the priority benefit under 35 U.S.C. § 119(e) of U.S. Provisional Application No. 62/597,571 filed on Dec. 12, 2017, the contents of which are herein incorporated by reference.

BACKGROUND

1. Field

The disclosed concept relates generally to methods for predicting when a nuclear reactor core will go critical and, more specifically, to a method for determining a global core reactivity bias and the corresponding estimated critical conditions of a nuclear reactor core prior to achieving reactor criticality.

2. Related Art

In a pressurized water reactor power generating system, heat is generated within the core of a pressure vessel by a fission chain reaction occurring in a plurality of fuel rods supported within the core. The fuel rods are maintained in a spaced relationship within fuel assemblies with the space between fuel rods forming coolant channels through which borated water flows. Hydrogen within the coolant water moderates the neutrons emitted from enriched uranium within the fuel rods to increase the number of nuclear reactions and thus increase the efficiency of the process. Control rod guide thimbles are interspersed within the fuel assemblies in place of fuel rod locations and serve to guide control rods which are operable to be inserted or withdrawn from the core. When inserted, the control rods absorb neutrons and thus reduce the number of nuclear reactions and the amount of heat generated within the core. Coolant flows through the assemblies out of the reactor to the tube side of steam generators where heat is transferred to water in the shell side of the steam generators at a lower pressure, which results in the generation of steam used to drive a turbine. The coolant exiting the tube side of the steam generator is driven by a main coolant pump back to the reactor in a closed loop cycle to renew the process.

The power level of a nuclear reactor is generally divided into three ranges: the source or startup range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux in the reactor at any point is proportional to the fission rate, the neutron flux is also proportional to the power level.

Fission and ionization chambers have been used to measure flux in the source, intermediate, and power range of a reactor. Typical fission and ionization chambers are capable of operating at all normal power levels; however, they are generally not sensitive enough to accurately detect low level neutron flux emitted in the source range. Thus, separate low level source range detectors are typically used to monitor neutron flux when the power level of the reactor is in the source range.

The fission reactions within the core occur when free neutrons at the proper energy level strike the atoms of the fissionable material contained within the fuel rods. The reactions result in the release of a large amount of heat energy which is extracted from the core in the reactor coolant and in the release of additional free neutrons which are available to produce more fission reactions. Some of these released neutrons escape the core or are absorbed by neutron absorbers, e.g., control rods, and therefore do not cause traditional fission reactions. By controlling the amount of neutron absorbent material present in the core, the rate of fission can be controlled. There are always random fission reactions occurring in the fissionable material, but when the core is shut down, the released neutrons are absorbed at such a high rate that a sustained series of reactions do not occur. By reducing the neutron absorbent material until the number of neutrons in a given generation equals the number neutrons in the previous generation, the process becomes a self-sustaining chain reaction and the reactor is said to be "critical". When the reactor is critical, the neutron flux is six or so orders of magnitude higher than when the reactor is shut down. In some reactors, in order to accelerate the increase in neutron flux in the shutdown core to achieve practical transition intervals, an artificial neutron source is implanted in the reactor core among the fuel rods containing the fissionable material. This artificial neutron source creates a localized increase in the neutron flux to aid in bringing the reactor up to power.

In the absence of a neutron source, the ratio of the number of free neutrons in one generation to those in the previous generation is referred to as the "neutron multiplication factor" ($K_{eff}$) and is used as a measure of the reactivity of the reactor. In other words, the measure of criticality for a nuclear core is $K_{eff}$, that is, the ratio of neutron production to total neutron loss contributable to both destruction and loss. When $K_{eff}$ is greater than 1, more neutrons are being produced than are being destroyed. Similarly, when $K_{eff}$ is less than one, more neutrons are being destroyed than are being produced. When $K_{eff}$ is less than one, the reactor is referred to as being "subcritical". Until relatively recently, there has been no direct method for measuring when criticality will occur from the source range excore detectors. Plant operators typically estimate when criticality will occur through a number of methods. One method for estimating when criticality will occur is made by plotting the inverse ratio of the count rate obtained from the source range detector as a function of the change in conditions being used to bring the plant critical, e.g., withdrawal of the control rods. When the plant goes critical, the source range count rate approaches infinity and hence, the Inverse Count Rate Ratio (ICRR) goes to zero. Due to the physics of the reaction occurring within the core of the reactor, the ICRR curve is almost never linear. The control rod position changes have a significant impact on the shape of the ICRR curve. Therefore, estimating the conditions under which the plant will go critical from the ICRR curve is subject to much uncertainty, but also subject to considerable scrutiny by the United States Nuclear Regulatory Commission and Institute of Nuclear Power Operations.

More recently, a method has been devised for directly predicting when the reactor will go critical. The method is described in U.S. Pat. No. 6,801,593. In accordance with the method, the reactivity of the core is increased while monitoring an output of a source range detector. A correction factor linearizes the ICRR so that the curve can be predictably extrapolated. The method thus describes a spatially corrected inverse count rate core reactivity measurement process. However, this method does not address the accuracy of the core reactivity measurement, which is dependent on the accuracy of the measured neutron radiation levels. In particular, it is very important that incremental changes in the measured neutron levels are determined accurately. The largest neutron measurement error component in a properly operating neutron radiation detector is typically caused by what is commonly called a "background signal". The background signal induces a response in the detector measurement that is not caused by source neutrons. This results in errors in the measured core reactivity changes. In order to improve the accuracy of the neutron population measurement, and obtain a corresponding improvement in accuracy in the ICRR reactivity measurement process, it is necessary to remove any significant background signal component from the measurement before the measurement is used to calculate the reactivity change. Prior to U.S. Pat. No. 7,894,565, there has been no direct method of determining the background signal content in a neutron signal measurement from the typical neutron detectors used in commercial nuclear power facilities. U.S. Pat. No. 7,894,565 provides one such method, but there is still room for improving the estimate when the core will go critical. Additionally, currently a need exists for a method that can determine if the core is performing as designed and whether anomalies exist, before the core goes critical. Currently, such an analysis can only be performed after the core goes critical as part of the low power physics testing process, which has to be successfully concluded before the reactor is brought up to full power.

SUMMARY

The disclosed concept provides a method of determining the global core reactivity bias for a nuclear reactor core with a $K_{eff}$ less than 1. The method comprises the step of measuring the subcritical neutron flux (i.e., measured neutron detector response) for one or more states of the reactor core. The method also includes the step of calculating a prediction of a spatially-corrected subcritical neutron flux (i.e., predicted neutron detector response) for the one or more states of the reactor core. The method then determines a difference between the measured and the predicted neutron detector response and records the difference as the global core reactivity bias. In one embodiment of the method, the measuring step is taken from the output of the source range detector and, preferably, the measuring, calculating and determining steps are performed under a plurality of steady-state subcritical conditions, i.e. state points. Desirably, the plurality of steady-state subcritical conditions are obtained by re-positioning the control rods while maintaining the other core conditions in steady-state.

The method may also include the step of using regression statistics of the measurements and predictions of the neutron detector response and applying a quantitative measured-to-predicted criteria on the regression statistics to detect various core anomalies while the plant is in a subcritical condition and prior to the plant achieving criticality. The method may further include the step of determining the reactivity bias between a predicted core and an actual core (i.e., as-assembled core following initial construction or refueling) by determining the uniform analytical reactivity adjustment, which is the systematic global reactivity bias, required to reconcile the measured neutron flux data with the predicted neutron detector response.

The method may be carried out by a processing device programmed to carry out the method. Instructions for carrying out the method may be captured on a machine readable medium for use by a processing device in carrying out the method.

BRIEF DESCRIPTION OF THE DRAWINGS

A further understanding of the disclosed concept can be gained from the following description of the preferred embodiments when read in conjunction with the accompanying drawings in which:

FIG. 1 is a schematic representation of the primary side of a nuclear power generating system.

DESCRIPTION

FIG. 1 illustrates the primary side of a nuclear electric power generating plant 10 in which a nuclear steam supply system 12 supplies steam for driving a turbine generator (not shown) to produce electric power. The nuclear steam supply system 12 has a pressurized water reactor 14 which includes a reactor core 16 housed within a pressure vessel 18. Fission reactions within the reactor core 16 generate heat, which is absorbed by a reactor coolant, light water, which is passed through the core. The heated coolant is circulated through hot leg piping 20 to a steam generator 22. Reactor coolant is returned to the reactor 14 from the steam generator 22 by a reactor coolant pump 24 through cold leg piping 26. Typically, a pressurized water reactor has at least two and often three or four steam generators 22 each supplied with heated coolant through a hot leg 20, which, along with the cold leg 26 and reactor coolant pump 2 form a primary loop. Each primary loop supplies steam to the turbine generator. One of such loops are shown in FIG. 1.

Coolant returned to the reactor 14 flows downward through an annular downcomer, and then upward through the core 16. The reactivity of the core, and therefore the power output of the reactor 14, is controlled on a short term basis by control rods, which may be selectively inserted into the core. Long term reactivity is regulated through control of the concentration of a neutron moderator such as boron dissolved in the coolant. Regulation of the boron concentration affects reactivity uniformly throughout the core as the coolant circulates through the entire core. On the other hand, the control rods affect local reactivity and therefore, result in an asymmetry of the axial and radial power distribution within the core 16.

Conditions within the core 16 are monitored by several different sensor systems. These systems include an excore detector system 28, which measures neutron flux escaping from the reactor 14. The excore detector system 28 includes source range detectors used when the reactor is shut down, intermediate range detectors used during startup and shutdown, and power range detectors used when the reactor is above approximately 5% power. Incore detectors are also typically employed during power operation; however, they are not relevant to this application.

Estimated critical conditions (ECC) are typically required as part of any reactor startup evolution. ECC is a combination of control rod and primary system conditions (e.g., soluble boron concentration, coolant temperature) that are expected to yield a critical reactor state. It is valuable, from a reactivity management perspective, that the ECC closely match the actual critical conditions of the core (i.e., the true combination of control rod position and primary system conditions that yield a critical reactor state). Furthermore, Plant Technical Specifications include a limiting condition for operation (also referred to as LCO) that the core reactivity be measured within a specified amount of the predicted core reactivity. The associated surveillances are performed prior to commencing power operation (typically >5% rated thermal power) after each core refueling, and generally every month afterward.

Various ECC combinations can be determined by nuclear design predictions prior to reactor core operation. However, a more accurate ECC projection can be obtained through ICRR monitoring and evaluation prior to reactor criticality, which can identify the presence of any global core reactivity bias. The global core reactivity bias is defined as the difference between the predicted reactivity state of the core and the actual reactivity state of the core determined by measurement. Subsequently, the bias can be incorporated into an updated ECC projection prior to reactor criticality.

ICRR monitoring is a common practice during shutdown/startup conditions that requires a baseline measurement from a neutron detector ($M_R$). Following a reactivity manipulation (e.g., control rod withdrawal) and achievement of a new steady state condition (state point), another measurement is collected ($M_i$). The ratio of $M_R/M_i$ is defined as the ICRR for state point i. As additional reactivity manipulations occur, ICRR can be updated and monitored in terms of changes from the reference measurement, and in turn, how the reactor is progressing towards (or away from) reactor criticality. If the intent is to startup the reactor (i.e., bring the reactor to a critical state), positive reactivity is added to the core (e.g., control rod withdrawal, primary system soluble boron dilution), and the ICRR is expected to approach zero.

As described in U.S. Pat. No. 6,801,593, due to the physics of the reactions occurring within the reactor core, the ICRR is not linear unless the reactor is very close to criticality; control rod position changes as part of pre-critical testing and the approach to criticality have a significant impact on the shape of the ICRR curve. Therefore, U.S. Pat. No. 6,801,593 provided a means of linearizing the measured ICRR with changes in control rod position or core conditions.

The method described in U.S. Pat. No. 6,801,593 relied on use of spatially-corrected ICRR ($ICRR_{SC}$) as the measurement parameter, which is a function of neutron detector measurements ($M_R/M_i$), but is dependent on nuclear design by way of spatial correction factors (SCFs). U.S. Pat. No. 6,801,593 defined SCF as a function of the static spatial factor and predicted eigenvalues obtained from subcritical, static calculations with and without fixed neutron sources.

Because $ICRR_{SC}$ is partly dependent on design prediction, use of $ICRR_{SC}$ as the primary measurement parameter is inherently subject to masking effects, where an error or bias in the design prediction can influence the measurement as well. Hence, it is desirable from a reactor physics measurement standpoint to eliminate predictive components from measurement results in order to eliminate the potential for masking effects. Therefore, the disclosed concept first defines a linear relationship between measured ICRR (a "pure" measurement, $M_R/M_i$, and with no predictive component) and predicted ICRR (a "pure" prediction, with no measurement component, but that accounts for any spatial effects that may have resulted from changes in plant configuration or core conditions between measurements $M_R$ and $M_i$).

After collecting multiple ICRR measurements, measured ICRR can be compared to the predicted ICRR at each state point. It is then possible to quantify a global reactivity bias by determining the uniform reactivity adjustment to the predicted ICRR at each state point that results in ideal behavior, which is defined as a linear fit and a y-intercept of zero when performing a linear fit of measured ICRR versus predicted ICRR. Fundamentally, the prediction is adjusted to match measurement and the adjustment is used to correct the predictions for future evolutions (e.g., final approach to criticality).

Recognizing that (1/M) theory is practically represented by monitoring changes in the measured neutron detector response from a baseline or reference condition, Equation (1) is a relationship familiar to nuclear reactor operators.

$$M_R*(1-k_R) \propto M_i*(1-k_i) \qquad (1)$$

wherein, $M_R$ and $M_i$ are neutron detector responses at the reference state point condition and a subsequent state point condition i, respectively, and $k_R$ and $k_i$ are the $K_{eff}$ values at the reference state point condition and a subsequent state point condition i, respectively.

Re-arrangement of terms yields a new Equation (2).

$$\frac{M_R}{M_i} \propto \frac{1-k_i}{1-k_R} \qquad (2)$$

In this form, the left side of the equation is now only the ratio of measured count rates ("raw", or not-spatially corrected, measured ICRR, $I_M$, i). The right side of the equation is comprised of core eigenvalues that can be predicted by nuclear design calculations (predicted ICRR, $I_P$, i) that take into account spatial effects resulting from changes in control rod positions or primary system conditions at the time of measurement. This separation of measurement from prediction is desirable in order to eliminate the potential for masking effects. In simplified form:

$$I_{M,i} \propto I_{P,i} \qquad (3)$$

The true regression of Equation (3) can be written as:

$$I_M = \beta_1 * I_P + \beta_0 \qquad (4)$$

The resultant estimate of the true regression, Equation (5), can be used as a basis for core design validation prior to at-power operation of the plant; specifically, incremental and total measured changes in ICRR can be compared to design prediction while the reactor is shutdown. The results evaluation is not subject to masking effects, and measured-to-predicted agreement (within pre-defined tolerance limits) demonstrates that the core is behaving as designed.

$$\hat{I}_M = m * I_P + b \qquad (5)$$

Ideally, the as-built measured core is identical to the as-designed predicted core, so that $\beta_1$ equals one and $\beta_0$ equals zero in Equation (4). However, in practice, this is not likely to be the case; some non-trivial differences will likely be present in the line fit of measured vs. predicted ICRR response. Regardless of the cause, it is especially useful to quantify systematic reactivity bias so that it can be used for criticality forecasting and monitoring purposes.

Returning to Equation (2), redefining the reference neutron detector measurement as a normalization constant (C) and rearrangement of terms yields the following:

$$M_i \propto \left[ C \cdot \frac{1-k_R}{1-k_i} \right] \qquad (6)$$

Equation (6) can be simplified and presented as a true regression by combining the normalization constant and predictive terms into a predicted detector response at state point i ($P_i$) that also accounts for spatial effects as explained previously:

$$M_i = \beta_1 * P_i + \beta_0 \qquad (7)$$

To quantify the global bias, the set of neutron detector measurements will be fit versus their corresponding predicted values. The resultant estimate of the true regression is defined in Equation (8).

$$\hat{M}_i = m*P_i + b \tag{8}$$

In an ideal situation, the y-intercept of the measured vs. predicted neutron detector response is zero. Assuming the regression estimate is linear and the data points are tightly fit, the global measured-to-predicted reactivity bias can be estimated by determining the amount of reactivity adjustment required to drive the y-intercept (b) to zero for the line fit defined in Equation (8). The uniform reactivity adjustment across all state points (imparted via changes in the $P_i$ values) that produces a line fit with a y-intercept (b) of zero is the estimated core reactivity bias.

$$\hat{M}_i = \acute{m} * \acute{P}_i \tag{9}$$

Accordingly, the disclosed concept utilizes a direct comparison of raw subcritical neutron flux measurements with corresponding predictions at each state point condition. This differs from prior power reactor physics testing methodologies, which require correction of the measurement data prior to results evaluation; the benefit of this method, in employing complete separation of measurements and predictions, is the prevention of masking effects (i.e., elimination of interdependency between measurement and prediction).

Additionally, the disclosed concept utilizes regression statistics of raw neutron detector measurements to corresponding predictions, and quantitative measured-to-predicted criteria on such, to detect various core anomalies while the plant is in a subcritical condition and prior to the plant achieving criticality. The benefit of this approach is that it provides an added measure of safety since anomalous core conditions can be detected during hot standby testing and can be anticipated during the final approach to criticality.

Furthermore, the disclosed concept utilizes a method of determining the reactivity bias between the predicted core and actual core by determining the uniform analytical reactivity adjustment (systematic global reactivity bias) required to reconcile the measured neutron flux data with predictions. This differs from previous power reactor physics test methodologies, for which the reactivity difference is determined based on measured reactivity at critical reactor conditions. The benefit of this approach is that it provides a way to identify anomalous reactivity indication/behavior in the subcritical state as a means of providing reactivity management guidance and/or accident prevention. Also, this method directly provides a reactivity bias offset on the predictive model used in the plant safety analysis.

Application of this method requires neutron detector measurements and corresponding core condition predictions that are provided by existing core design codes and account for the subcritical neutron flux distribution. The basic uses of this method are to monitor and project the subcritical state of the core. Associated applications include monitoring of negative reactivity conditions or shutdown margin, and forecasting of estimated critical conditions prior to plant startup. The method amounts to Subcritical Physics Testing, which integrates the monitoring and forecasting function to ultimately execute a series of measured-to-predicted comparisons to confirm the as-built core is operating consistent with design following refueling; results that could only previously been achieved during low power testing after the reactor went critical.

A key piece of information needed for the safe and efficient operation of a subcritical reactor core is the negative reactivity of the core; that is, the amount that the core is subcritical, also known as the shutdown margin. Prior to development of the methodology described herein, this information has only been inferred, and not directly measured.

The basic uses of this method are to project and monitor the negative reactivity of a subcritical core for any static configuration of interest, i.e., a steady-state combination of control rod position and primary system conditions, through the use of neutron detector signal measurements and advanced subcritical core predictions. A series of subcritical measured-to-predicted comparisons during plant startup forms the basis for the integrated application of this methodology, i.e., the measured-to-predicted comparisons are performed at a number of steady-state subcritical conditions, each of which is referred to as a state point.

This method is performed at static and subcritical conditions (vs. the dynamic and critical conditions for traditional low power physics testing). This method is revolutionary in that it is not just an extension of the steps performed during low power physics testing. However, this method achieves the same objective as low power physics testing; following refueling and prior to returning to normal operation, testing is performed to determine if the operating characteristics of the core are consistent with design predictions as a means to ensure the core can be operated as designed.

While achieving the same objective as low power physics testing, performing this method yields inherent safety, human performance, and test performance benefits over low power physics testing. Performing measurements at static and subcritical conditions inherently enhances plant safety and reactivity management. This method is seamlessly integrated into routine plant startup activities as opposed to necessitating infrequently performed tests and evolutions and special test exceptions to plant operations, which improves test reliability and human performance. Therefore, this method-based core design verification offers broad benefits for essentially any plant type.

It is to be appreciated that methods as described herein can be carried out by a processor or processing device of a computer system or by other means of carrying out the function. Thus, a processor with the necessary instructions programmed directly therein or on a machine readable medium accessed thereby for carrying out such a method or element of a method forms a means for carrying out the method or element of a method. Furthermore, an element described herein of an apparatus embodiment is an example of a means for carrying out the function performed by the element for the purpose of carrying out the invention.

While specific embodiments of the disclosed concept have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the disclosed concept which is to be given the full breadth of the appended claims and any and all equivalents thereof.

What is claimed is:

1. A method of determining a global core reactivity bias for a nuclear reactor core and bringing the nuclear reactor core to a critical reactor state, the method comprising:
   predicting a combination of parameters expected to yield the critical reactor state of the nuclear reactor core, wherein the parameters comprise control rod position, soluble boron concentration, and coolant temperature;

operating a nuclear reactor at a first subcritical state;

measuring, using a source range detector, a first measured neutron flux value while the nuclear reactor is operating at the first subcritical state;

adjusting the nuclear reactor to operate at a second subcritical state by repositioning at least one control rod of the nuclear reactor;

measuring, using the source range detector, a second measured neutron flux value while the nuclear reactor is operating at the second subcritical state;

predicting a first spatially-corrected neutron flux value for the first subcritical state and a second spatially-corrected neutron flux value for the second subcritical state;

comparing each of the measured neutron flux values with the corresponding spatially-corrected neutron flux values to determine the global reactivity bias;

wherein a spatial correction factor is not applied to the measured neutron flux values;

updating the predicted combination of parameters by adjusting at least one of the parameters according to the global reactivity bias; and bringing the nuclear reactor core to the critical reactor state using the updated combination of parameters.

2. The method of claim 1, further comprising performing a regression analysis to determine a relationship between the measured neutron flux values and the corresponding spatially-corrected neutron flux values to determine the global reactivity bias;

wherein the determined global reactivity bias is used to detect an anomaly associated with the nuclear reactor core without operating the reactor at a critical state.

3. The method of claim 1, wherein the first subcritical state and the second subcritical state are steady-state conditions.

4. The method of claim 1 wherein the predicted combination of parameters are updated without operating the nuclear reactor at the critical reactor state.

5. The method of claim 1, wherein operating the reactor at the first subcritical state occurs after an initial construction of the nuclear reactor.

6. The method of claim 1, wherein operating the nuclear reactor at the first subcritical state occurs after a refueling of the nuclear reactor.

7. The method of claim 2, wherein the anomaly associated with the nuclear reactor core is an anomalous reactivity behavior.

8. A processing device programmed to carry out the method of claim 1.

9. A machine readable medium comprising instructions for carrying out the method of claim 1.

\* \* \* \* \*